United States Patent
Bence, Jr. et al.

(10) Patent No.: US 6,484,178 B1
(45) Date of Patent: Nov. 19, 2002

(54) UNIVERSAL CLAIMS FORMATTER

(75) Inventors: Gene Philip Bence, Jr., West Hartford; William Raymond Kenney, Rocky Hill; Gary Julian, Wethersfield; Daniel Robert Reinholdt, Suffield; Edward Daniel Welcome, Jr., Bloomfield; John L. Peet, Colchester, all of CT (US)

(73) Assignee: The Merallis Company, Rocky Hill, CT (US)

( * ) Notice: Subject to any disclaimer, the term of this patent is extended or adjusted under 35 U.S.C. 154(b) by 0 days.

(21) Appl. No.: 09/475,476

(22) Filed: Dec. 30, 1999

(51) Int. Cl.[7] .............................................. G06F 17/30
(52) U.S. Cl. ........................ 707/101; 707/523; 707/531
(58) Field of Search ................................. 707/100–102, 707/4, 513, 523, 530, 531; 709/246

(56) References Cited

U.S. PATENT DOCUMENTS

| | | | | |
|---|---|---|---|---|
| 4,559,614 A | * | 12/1985 | Peek et al. ................... 709/100 |
| 5,392,390 A | * | 2/1995 | Crozier ....................... 345/762 |
| 5,438,657 A | * | 8/1995 | Nakatani ..................... 707/506 |
| 5,629,846 A | * | 5/1997 | Crapo ......................... 708/705 |
| 5,893,134 A | * | 4/1999 | O'Donoghue et al. ....... 707/536 |
| 5,911,776 A | * | 6/1999 | Guck .......................... 709/217 |
| 6,023,708 A | * | 2/2000 | Mandez et al. ............. 707/203 |
| 6,336,124 B1 | * | 1/2002 | Alam et al. ................. 707/523 |
| 6,345,244 B1 | * | 2/2002 | Clark ............................ 704/2 |
| 6,397,232 B1 | * | 5/2002 | Cheng-Hung et al. ...... 707/523 |

* cited by examiner

Primary Examiner—Maria N. Von Buhr
(74) Attorney, Agent, or Firm—Venable; Jeffrey W. Gluck

(57) ABSTRACT

An inventive method and computer system convert known or unknown input file formats to a common file format with a reduced amount of human intervention and greater speed, in comparison to prior-art methods and products. The conversion involves the viewing, by an operator, of a given input file; the determination as to whether or not the format of the input file matches a known format; the specification of data coordinates within each record in the input file; and the conversion of the input file to the common file format. Newly created file formats may be stored and used as existing file formats. A "garbage collection" module automatically removes extraneous unprintable characters and helps to standardize the control character formats, prior to matching.

27 Claims, 15 Drawing Sheets

| vwOfficeFormat imported data | | | | |
|---|---|---|---|---|
| Office ID: ME007 | Status Code: T | Office Name: BETHEL STATION CHIROPRACTIC OFFICE | | |
| MMS Vendor Name: EON | | | Version: 2.1 | |
| Operating System: WIN95 | | | Hardware: Pent | |
| Data Capture Method: | | | Printer Make/Model: | |
| Electronic Submission: No | | Electronic Format HCFA: Yes | Electronic Format NSF: No | |
| Data Capture Printer: No | | Data Capture File: Yes | Format ID: 217 | |
| Number of Lines Per Claim: 60 | | Run Garbage Collection: Yes | Control Totals: No | |
| Lines to Skip at top of File: 0 | | Claim Test File Name: G:\Data\RAW\Me007.aac | | |
| Office assigned to user: dianaw | | | | |

UNIVERSAL CLAIMS FORMATTER

TECHNICAL FIELD

The present invention relates to a method, computer program product and computer system for adapting file formats. In particular, it is directed to the acceptance of files formatted in one file format and converting the files into a common file format. This has particular application in the electronic processing of insurance claims.

BACKGROUND OF THE INVENTION

In such industries as the electronic insurance claims processing industry, numerous different claim file formats are used, depending upon the source of the files. In the insurance industry, for example, such formats include HCFA-1500 print images, a standardized format developed by the U.S. Healthcare Financing Administration, UB92 print images and others. Additionally, even within a given format, different generators of files may use the formats differently.

This proliferation of different file formats and variations on file formats has led to difficulties in the electronic processing of such files. In the past, a company that performed such processing would have to receive a test file from each new client, and a (human) programmer would have to develop software specific to the particular client's file format. Each of such pieces of software was called a "scrubber program," and each scrubber program would generally need to be developed anew for each client (on occasion, a common scrubber program could be used for more than one client). This process was very expensive, requiring large amounts of manpower, and was, thus, also slow.

While some format translation programs do exist, such programs have tended to be very slow, capable of processing approximately one claim per minute. In a high volume business, such translation rates are unacceptable, requiring too much time to process the claims.

SUMMARY OF THE INVENTION

It is an object of the present invention to provide a claim formatting method and computer program product capable of accepting files in numerous formats, which may be initially unknown, and formatting them into a common format for processing.

It is a further object of the present invention to do so with a reduced amount of human labor, in comparison with prior-art methods.

It is a further object of the present invention to do so in such a way that the method/computer program can learn input formats that it has not processed before.

It is yet a further object of the present invention to do such formatting at a high rate of speed.

These and other objects are achieved by the inventive method and system.

The method of the present invention comprises steps of: (1) viewing information about the client or office submitting a file containing data records (e.g., claims); (2) examining the submitted client data file; (3) finding a known data format that most closely matches the format of the client data file, known data formats being stored in a format database; (4) aligning the data contained in a given record, thus, creating a format corresponding to the client's data format; and (5) if the resulting format is different from all formats in the format database, saving the newly-created client format as a new known format. As a step between steps (4) and (5), the method may also allow the testing of the newly-created format on the client's data file by a "running claim edits" function; this function serves to mass convert the client's data records into a common data format and permits testing of the conversion. The method may further comprise a step of writing a scrubber program, should the above steps fail.

The step of examining the submitted client data file includes an optional step of "collecting garbage." This step involves such functions as removing extraneous control characters and correcting for non-standard formatting conventions. For example, standard control characters may be added to each record to standardize the format.

The system of the present invention comprises a computer having software embodied on a computer-readable medium, the software implementing the above method and comprising: (1) a View Office Information module, providing an operator with the ability to view information about a client/office submitting a file containing data records (e.g., claims); (2) an Examine Test Claim File module, allowing the operator to view data from the file submitted by the client; (3) a Find Closest Match module, automatically searching a known format database for a format that most closely matches the format of the data records in the client data file; (4) an Align Claim Data module, providing the operator with the capability of modifying the closest matching data format to create a new format matching the specific client's data record format; and (5) a Save Office Format module, allowing the operator to save the newly-created data format in the known format database. The software may further include a Run Claim Edits module that allows the operator to test the newly-created format on the client's data file; Run Claim Edits performs format conversion into a common data format using the newly-created format and permits the observer to ascertain whether or not the conversion was successful. The software may further comprise at least one scrubber program written separately to account for file formats for which the program modules above fail to produce acceptable results.

The Examine Test Claim File module includes an optional Garbage Collection module. This module involves such functions as removing extraneous control characters and correcting for non-standard formatting conventions. For example, standard control characters may be added to each record to standardize the format.

Definitions

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer.

Examples of a computer-readable medium include: a magnetic hard disk; a floppy disk; an optical disk, like a CD-ROM or a DVD; a magnetic tape; a memory chip; and a carrier wave used to carry computer-readable electronic data, like those used in transmitting and receiving e-mail or in accessing a network.

"Software" refers to prescribed rules to operate a computer. Examples of software include: software; code segments; instructions; computer programs; program modules; and programmed logic.

A "computer system" refers to a system having a computer, where the computer includes a computer-readable medium embodying software to operate the computer.

BRIEF DESCRIPTION OF THE DRAWINGS

For a better understanding of the present invention and the advantages thereof, reference is now made to the following description taken in conjunction with the accompanying drawings, in which:

FIG. 4 depicts a screen displayed in the View Office Information function, according to an exemplary embodiment of the invention;

FIG. 9 depicts the screen displayed in the Align Claim Data function, according to an exemplary embodiment of the invention;

DETAILED DESCRIPTION OF THE INVENTION

The present invention is directed toward a method and computer system for reformatting input data files received from clients. Specifically, the present invention deals with creating a format (template) tailored to a client office's data records/files, for the purpose of facilitating the conversion of such data to a common format. The created format may then be used in a batch-processing program to mass convert such data files into the common format.

Figure 1:
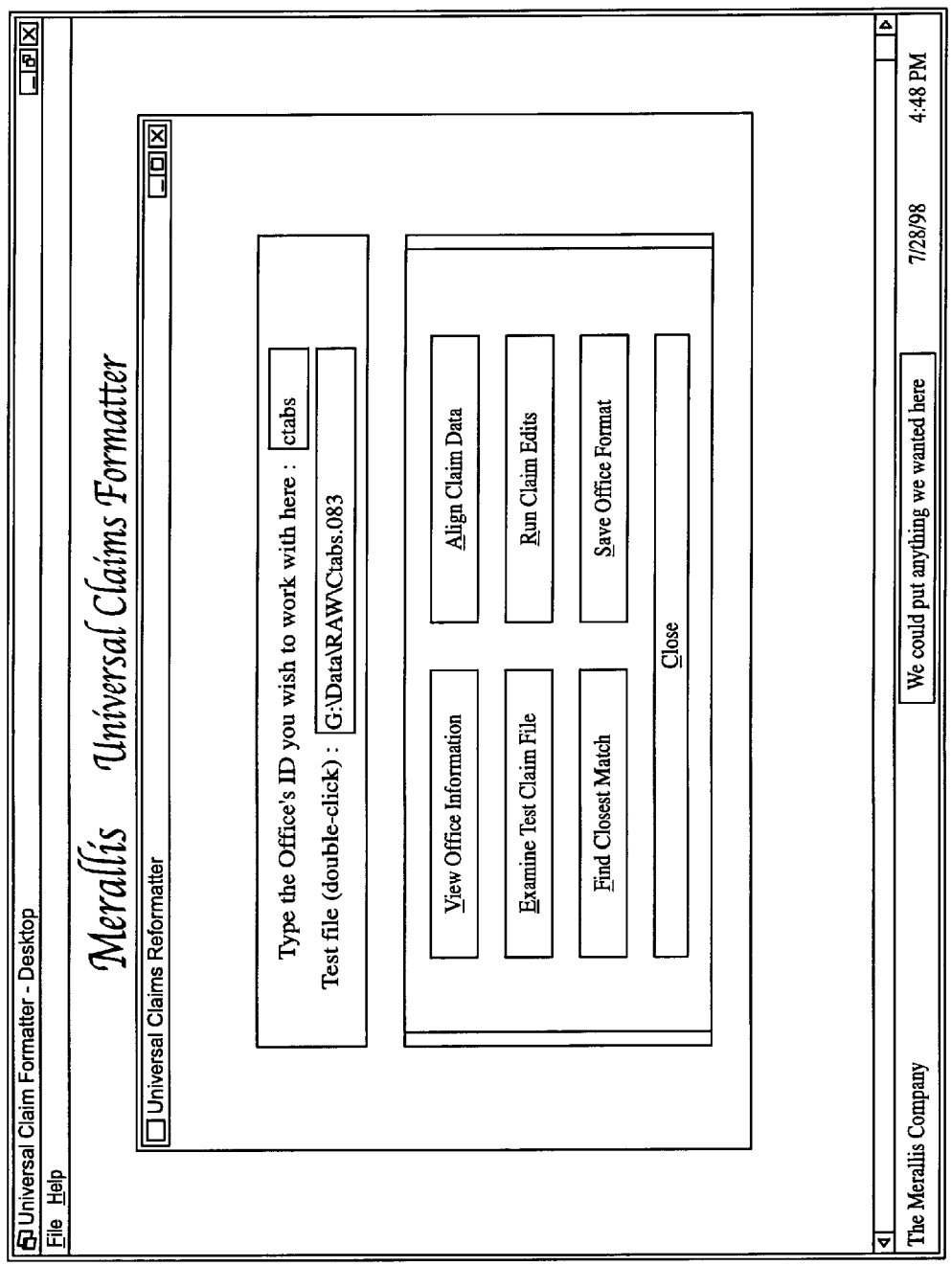
FIG. 1 depicts the main menu screen of an exemplary embodiment of the invention.
Figure 2:
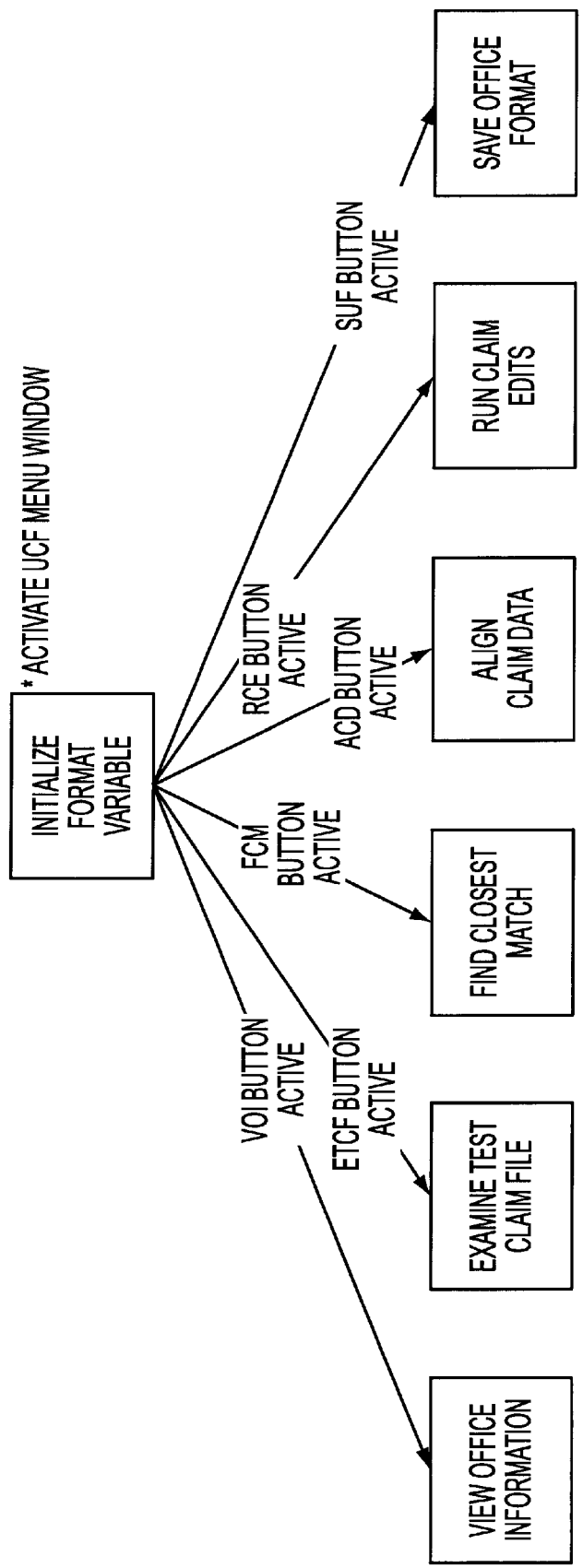
FIG. 2 is a flowchart showing the execution of the main program module of an exemplary embodiment of the invention.
Figure 3:
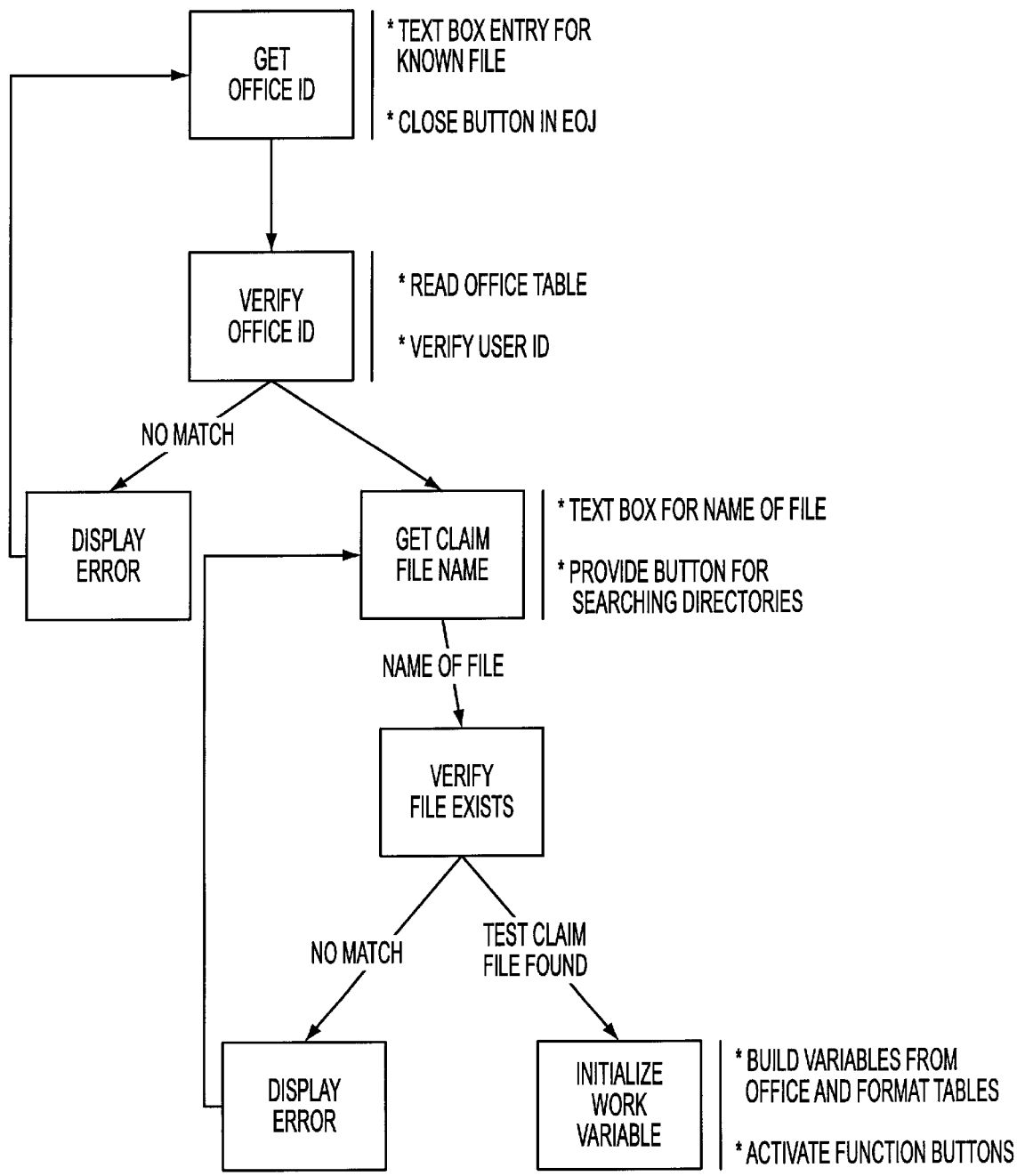
FIG. 3 is a flowchart depicting the steps of entering data about a client office and checking it against known data, in an exemplary embodiment of the invention.

In an exemplary embodiment of the data formatter of the present invention, a human operator, or production analyst, executes a computer program in a Windows® or other computing environment, to obtain a main menu screen as depicted in FIG. 1. This screen is the result of the execution of a main program module of the data formatter, as shown in FIG. 2. The main menu screen/main program module prompts the operator to identify a client whose data is to be analyzed and formatted and, optionally, to enter a specific name of a file containing the data. In a further embodiment, the client is identified by entering an Office ID, either by typing it in, if known, or by means of a drop-down selection menu of a type well known in the art. In a further embodiment, the file name may either be typed or be entered by means of a standard file opening function, as is well known in the art; furthermore, in yet another embodiment, if the operator has entered the Office ID of a client with whose data he has previously worked, the name of the client's data file with which the operator has most recently worked will be displayed. These steps, as implemented in an exemplary embodiment of the invention, are shown in the flowchart of FIG. 3, which also details steps taken to insure that the Office ID exists in a database.

The exemplary main menu screen of FIG. 1 includes seven buttons, corresponding to the seven program modules shown in FIG. 2. To operate the program, the operator selects among the buttons as appropriate. When the operator is finished with a particular function, he simply closes the function, using a "Close" button or other standard window-closing button, as is well known.

In the subsequent discussion, each of the program modules/steps of an exemplary embodiment of the invention will be individually described.

1. View Office Information

The View Office Information function permits the operator to examine any existing information about a client that is already stored in a client database. Should no such information be stored, the program gives the operator the option of initially assigning a default file format to the client.

FIG. 4 shows an exemplary screen displayed by the View Office Information function. The data displayed therein are as follows:

| FIELD | COMMENTS |
|---|---|
| Office ID: | Office ID as entered on the Main Menu. |
| Status Code: | T indicates TEST status. A indicates ACTIVE. N indicates NEW. |
| Office Name: | Office (Client) Name from the Office Table (i.e., a client database). |
| Vendor: | Name of software producing the formatted files at the client's office. |
| Version: | The software version of the office's software. |
| Operating System: | The operating system installed on the computer implementing the present invention. |
| Hardware: | Describes the computer used at the client's office. |
| Data Capture Method: | 1 or 2 |
| Printer Make/Model: | The printer used in the client's office. |
| Electronic Submission: | Yes/No |
| Electronic Format HCFA: | Yes/No (Does the client use a form of the HCFA 1500 format?) |
| Electronic Format NSF: | Yes/No (Does the client use a form of the NSF 20 format?) |
| Data Capture Printer: | Yes/No. If 'Yes' may require Garbage Collection (see below). |
| Data Capture File: | Yes/No |

-continued

| FIELD | COMMENTS |
| --- | --- |
| Format ID: | The Format ID currently being used to format client's office data. Format 0 is the initial default format. |
| Number of Claim Lines: | Number of lines from beginning of one data record (claim) to the beginning of the next data record (claim). The default value will be 60. The operator will determine the correct value and enter it on the screen. |
| Garbage Collect: | Specified by the operator via the Examine Test Claim File screen (see below; i.e., does the operator wish to invoke the Garbage Collection function?). |
| Control Totals: | Specified by the operator on Examine Test Claim File screen (not currently implemented). |
| Lines to Skip: | Number of lines prior to the first claim to be skipped. The operator enters this on the Examine Test Claim File screen (see below). |
| Claim Test File Name: | Name of the file containing the client's office's data. |
| Office Assigned to User: | The User ID of the individual working on a given client's office's data. This prevents two people making changes to the formatting information and possibly overlaying each other's work. |

The bold, italicized fields contain information used in the Find Closest Match function described below.

The View Office Information program module is implemented, in an exemplary embodiment of the invention as follows. When the operator activates the View Office Information function, the program uses the Office ID entered by the operator and uses it to retrieve the associated information from the aforementioned database.

2. Examine Test Claim File

The Examine Test Claim File function is used to review a raw data file provided by a client office (i.e., a file containing records received from the client office and not yet in the common format used by further processing arrangements), to identify parameters of the data formatting used in the data records of the file, and to add the parameters to the client office profile data (i.e., the data viewed in View Office Information).

Figure 5:
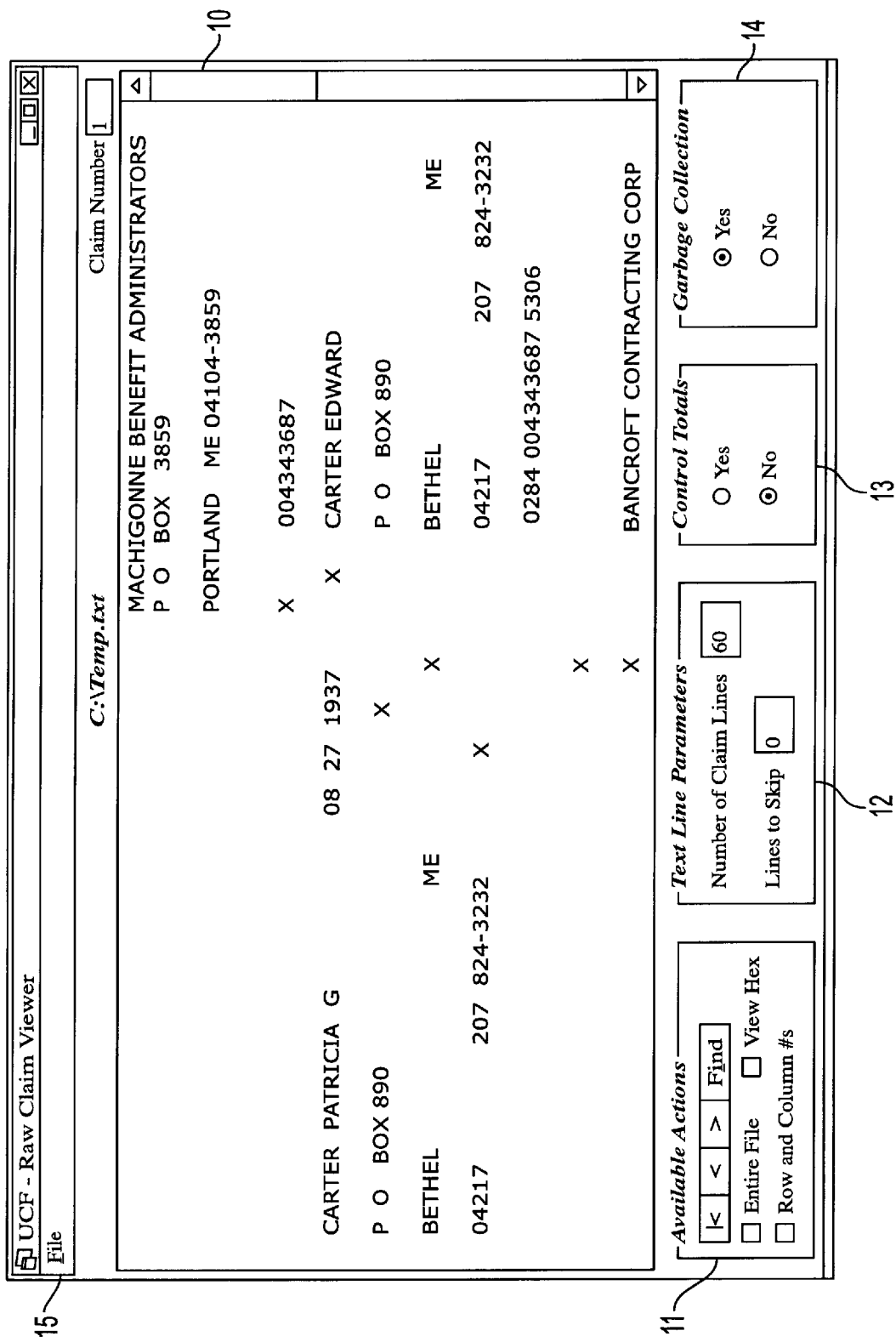
FIG. 5 depicts a screen displayed in the Examine Test Claim File function in an exemplary embodiment of the invention.

FIG. 5 depicts a screen display for the Examine Test Claim File function in an exemplary embodiment of the invention. The screen initially shows the first portion of the first data record (or claim) in the data file. The operator may scroll through the record using a standard scroll bar 10 or may advance through the data file using buttons in the Available Actions portion 11 of the screen; these buttons will be described in the discussion below.

The screen shown in FIG. 5 allows the operator to specify three characteristics of the data record file:

Number of lines per record (claim)
Number of lines to skip at the start of the file (prior to beginning of first record [claim])
Garbage collection (explained below).

The two Text Line Parameters buttons 12 will now be explained. The Number of Claim Lines should be determined first. Note that the default value in the Number of Claim Lines box is 60. To see if this value is correct, the operator presses the Next Claim button symbolized by ">" in the Available Actions section 11 of the screen. This will jump the display to the second record (claim) and the beginning of the second should be positioned where the beginning of the first record was.

If the beginning of the second record is down several lines from the top of the display, the operator counts the number of lines from the top of the display to beginning of the second record. He then adds this number to 60 and enters this value into the Number of Claim Lines box. The operator then tests this Number of Claim Lines value by pressing the Next Claim button. Again the beginning of the next record should be positioned where the beginning of the previous record was. This process can be repeated until pressing Next Claim always displays the beginning of each record in the same position.

If there are still differences in the positioning, the next step should be to determine if there are Lines to Skip in the beginning of the file. Occasionally there is a one-time occurrence of miscellaneous information or unreadable characters prior to the beginning of the first record. If such lines exist, the operator must count the number of these miscellaneous lines and enter the number in the Lines to Skip box. The operator then checks for correctness by pressing Next Claim through the file.

The Refresh From Beginning button symbolized by "|<" takes the display back to the first record of the file at any time.

Some software packages handle printing of claims by inserting print control characters (carriage return or line feed) at unusual spots in a claim. These unusual print control characters will be seen as stray garbage characters anywhere within the claim data or at the end of a line. Clicking on the Yes box in the Garbage Collector section 14 can eliminate these characters and generally provide for a more standardized format; the Garbage Collection function is described in further detail below.

In addition to completing the required four definitions, the Examine Test Claim File screen offers a convenient way to view records. Analysis of, for example, medical claim records includes finding specific records that contain unique or rarely used data fields such as CPT (Physicians' Current Procedural Terminology code) modifiers and the presence of multiple diagnosis codes. This can most easily be done in Examine Test Claim File.

A Find Claim button is available in the Available Actions section 11, as well, to aid the operator in moving through the file. Clicking on the Find Claim button results in a prompt for a particular record number. By typing in a desired record number at the prompt, that record will appear in the viewer after the system has applied any changes that have been made, for example, selecting Yes for Garbage Collection and setting the Number of Claim Lines to 62.

The three check-off options in Available Actions 11 are there to help in understanding the placement and formatting of the records and data record file. One clicks on Entire File when it is necessary to scroll through the complete file. Clicking on View Hex permits the operator to view the claim in hexadecimal (hex) mode, with the hex code for each individual character found below the character of the data record. Clicking Row and Column #'s allows the operator to view a graph of row and column numbers, permitting him to view the positions of the data within a record. Note that the View Hex and Row and Column #'s options can only be applied when the Entire File option is off.

The operator may opt to print out individual records by selecting the File menu 15 and then Print Current Claim, an option within the File menu (not shown).

Figure 6A:
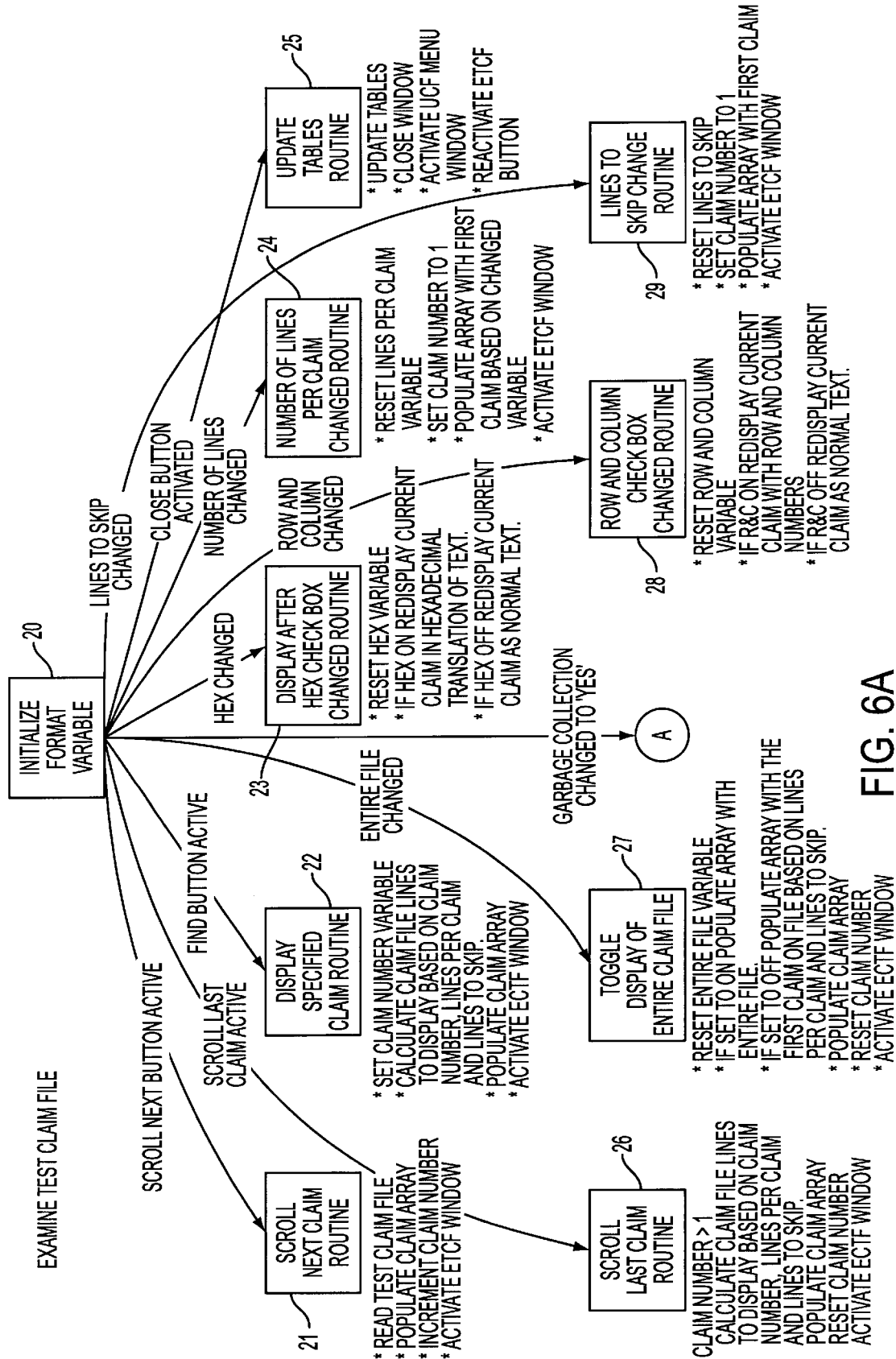
FIG. 6A is a flowchart of the main portion of the Examine Test Claim File program module according to an exemplary embodiment of the invention, with FIGS. 6B and 6C showing a detailed flowchart of the inventive Garbage Collection program module.
Figure 6B:
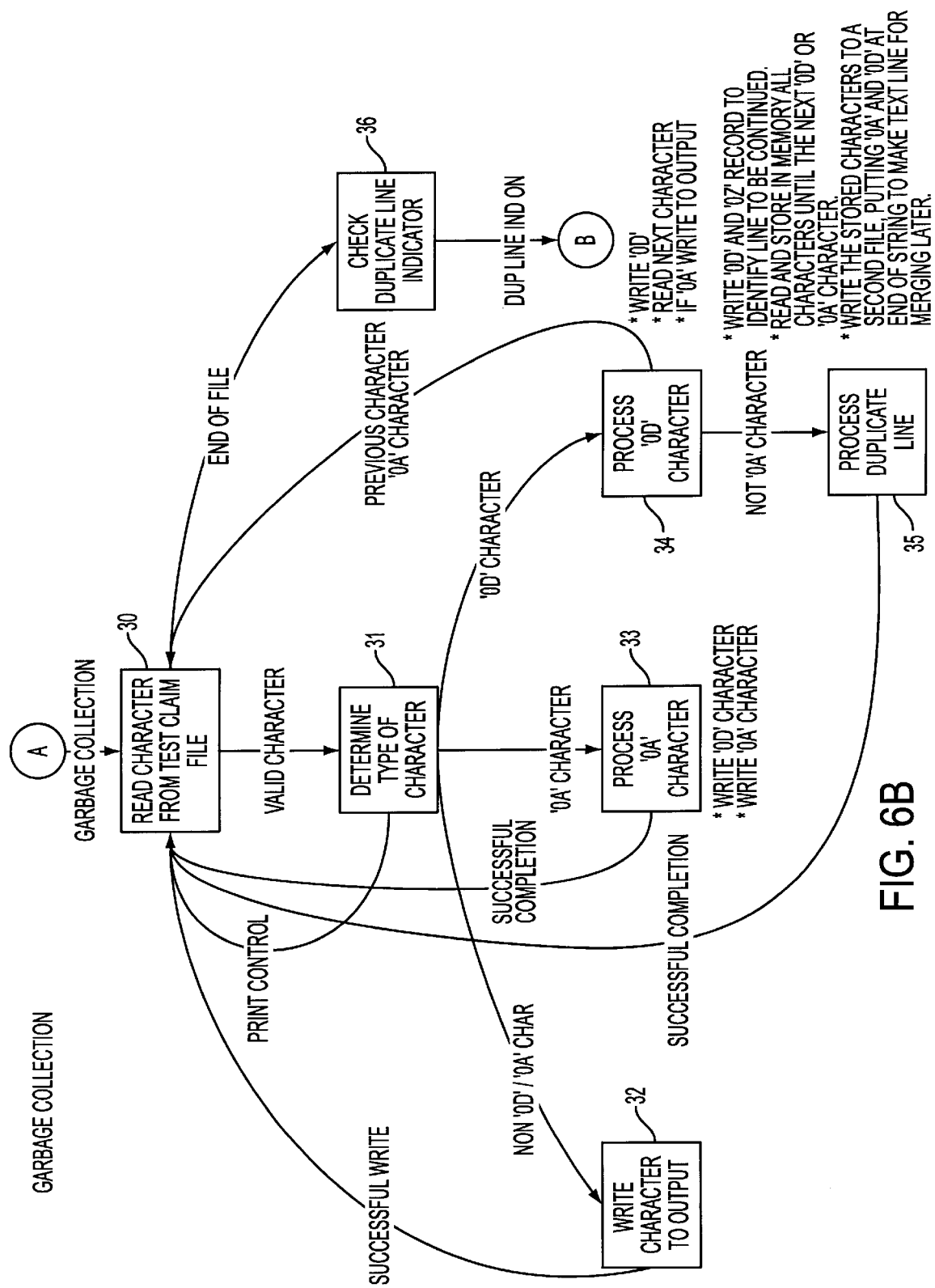
Figure 6C:
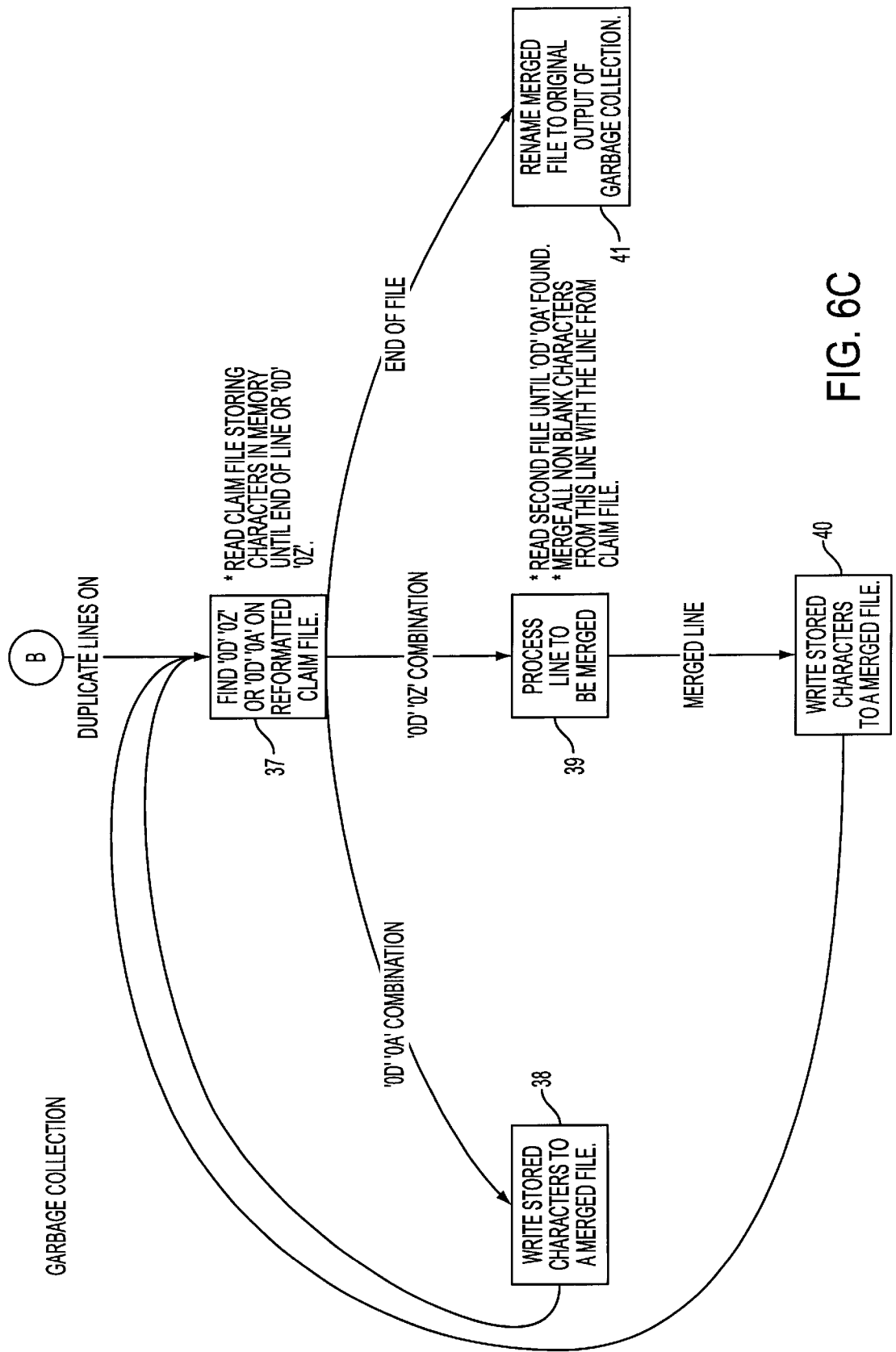

FIGS. 6A–6C contain a flowchart of a software module implementing the Examine Test Claim File functions, with FIGS. 6B and 6C particularly detailing the Garbage Collection function, all according to an exemplary embodiment of the invention. Note that these flowcharts are for a sample implementation in which the records represent (medical) claims.

In these and subsequent flowcharts, a box represents a routine or action taken by the module. Bullet items shown next to or under a box represent sub-steps of the routine or action in the box. Arrows with boldface words through them depict the flow of the module as various inputs or conditions occur, according to the boldface words.

FIG. 6A shows the detailed steps for implementing the various functions described in connection with FIG. 5, according to an exemplary embodiment of the invention. The steps are self-explanatory and will not be discussed further, except with regard to the condition where the operator opts for garbage collection, which leads to Point A of FIG. 6B.

FIGS. 6B and 6C show the detailed steps carried out by an exemplary embodiment of the Garbage Collection module of the invention. Garbage Collection begins at Step 30 by reading in a character from the data file. If the end of the file has not been reached (i.e., the character is not an "End-of-File" character), the module tests the character to determine its type in Step 31. Step 31 determines if a given character is a "0A" (line feed) control character, a "0D" (carriage return) control character, a print control character or a non-control (i.e., non-"0A"/"0D") character. In the latter case, the character is written directly to output and the program proceeds back to Step 30. If the character is a print control character, it is discarded, and the program proceeds back to Step 30 to read in the next character. If the character is of the "0A" or "0D" type, the program proceeds either to Step 33 or to Step 34, respectively, where these characters are appropriately processed. If the program went to Step 34 and the next character turned out not to be a "0A" character, then the program proceeds to Step 35 for duplicate line processing before reverting back to Step 30; otherwise, the program reverts back to Step 30 from Step 34. Note that in Step 35 a "0Z" character is inserted; this is a special control character inserted by the inventive method/system, used for duplicate line processing.

If the character read in Step 30 is an "End-of-File" character, the program proceeds to Step 36 to determine whether or not the duplicate line indicator has been turned on. If not, then the process is complete. If, however, the duplicate line indicator is on, then the program goes to Point B of FIG. 6C. In Steps 37–40, sets of control characters are detected, and lines of data are merged where appropriate. When the end of the file is reached, the program goes to Step 41, where the merged file becomes the output, and the Garbage Collection process is complete.

When exiting from Examine Test Claim File, and if any changes were made to the office format, the operator is prompted to decide whether or not to save the changes. The operator is given three options: Yes, No and Cancel. If the operator chooses Yes, then the changes are saved by adding a record to the Office Table (i.e., the client office database). If the operator chooses No, then no changes are saved. Following a Yes or No, the program reverts back to the main menu screen (FIG. 1). If the operator chooses Cancel, then the program simply remains in Examine Test Claim File.

3. Find Closest Match

The Find Closest Match function is used to select an existing stored record format that most closely matches a new client office format and, if desired, to assign the format to that client office. This function is performed using the seven parameters shown in bold italics in the discussion of View Office Information above.

Figure 7:
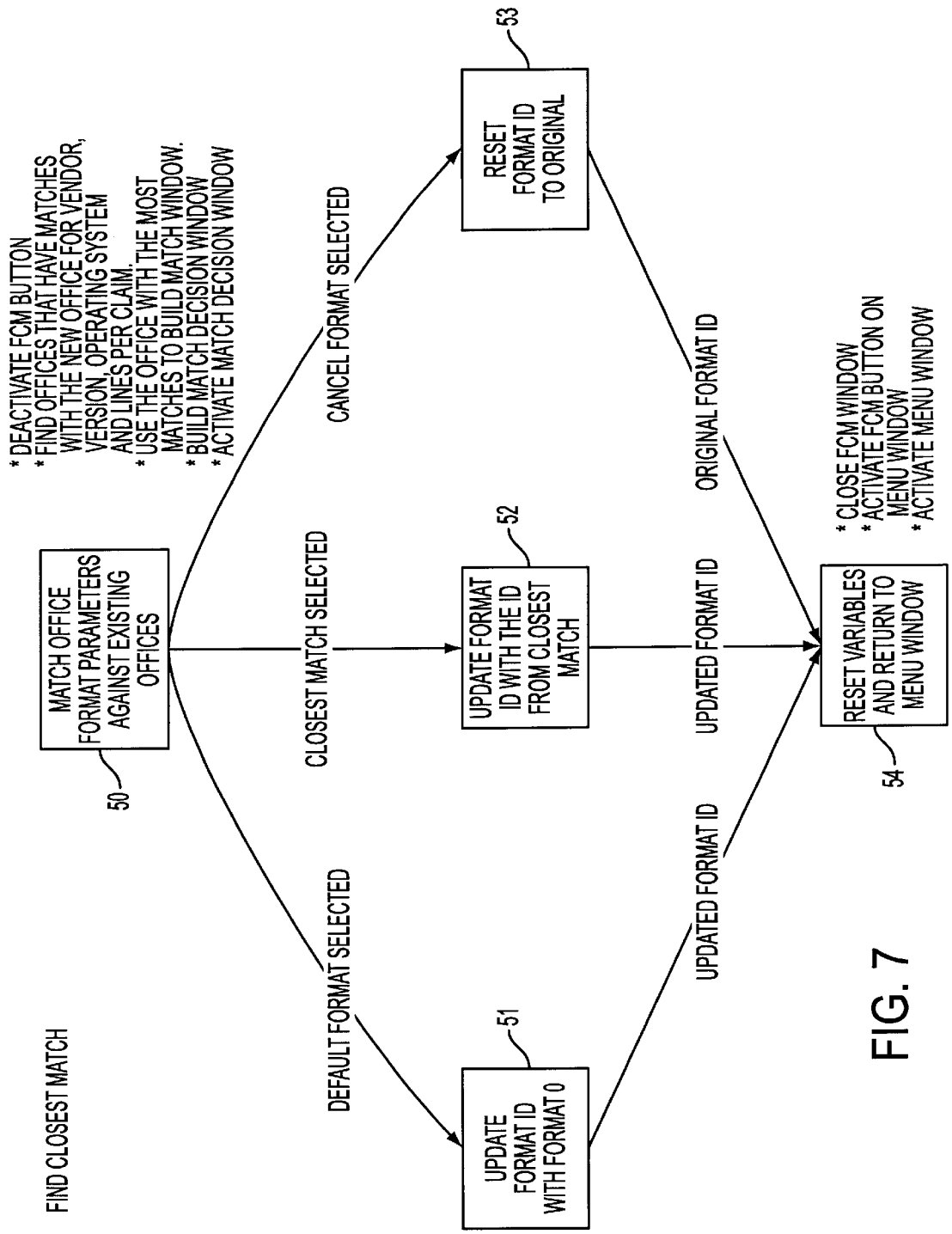
FIG. 7 is a flowchart depicting the structure of a software module implementing the Find Closest Match function, according to an exemplary embodiment of the invention.

When the operator invokes the Find Closest Match function, by clicking on the appropriate button on the main menu screen (FIG. 1), the program module that implements Find Closest Match performs the steps detailed in the flowchart in FIG. 7. The process begins in Step 50 by matching the parameters of the current client office format with those stored in the Office Table. The results of this matching are displayed in a screen depicted in FIG. 8. The operator may then opt to change the Format ID for the current client office to the one found in the match by choosing Yes, which takes the program module to Step 52. The operator may opt to change the Format ID to the default format by selecting No, which takes the program module to Step 51. Finally, the operator may opt simply to use the current Format ID by choosing Cancel, which takes the program module to Step 53. Following any of Steps 51–53, the program module goes to Step 54, from which the program reverts back to the main menu screen.

Figure 8:
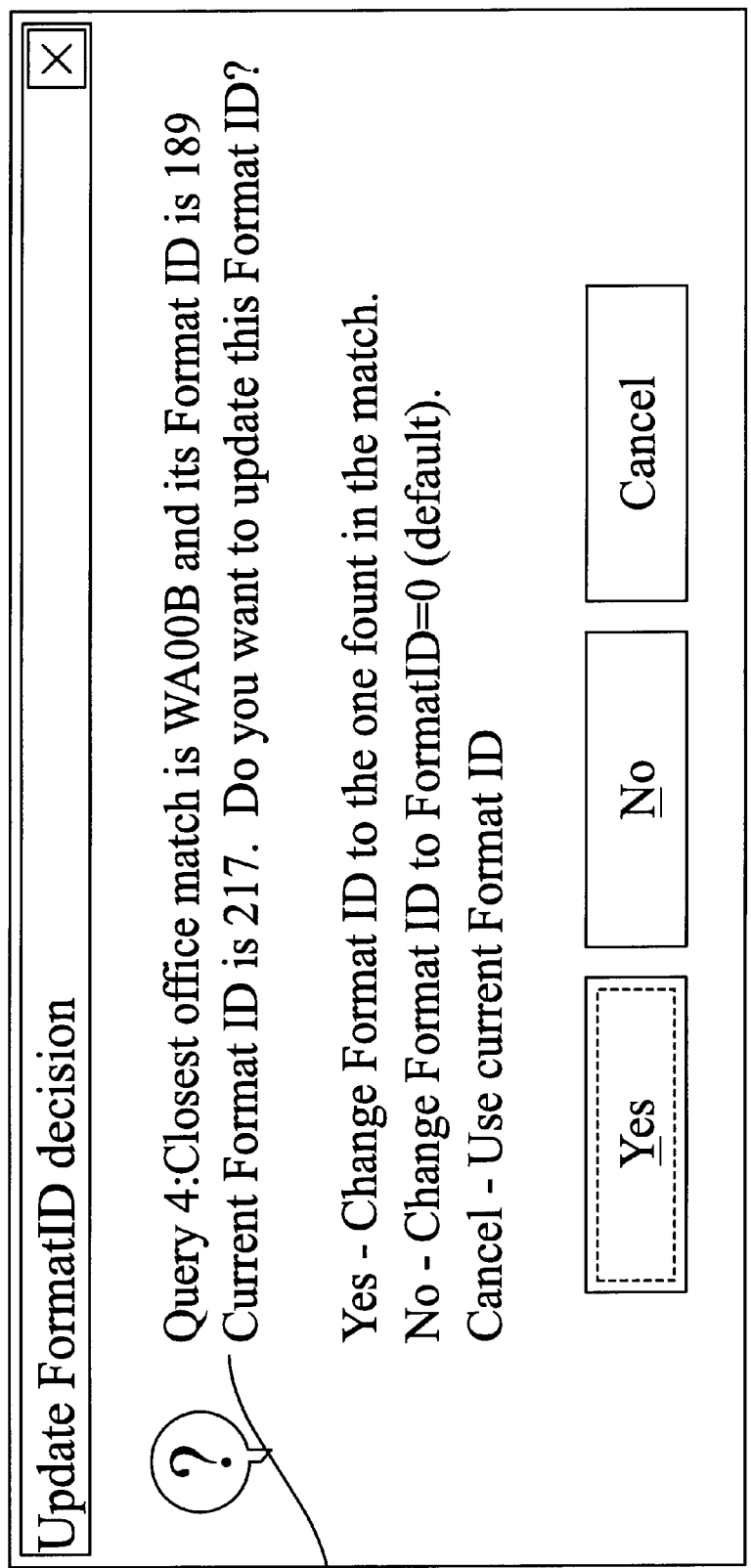
FIG. 8 depicts a screen displayed upon the execution of the Find Closest Match function, according to an exemplary embodiment of the invention.

The screen of FIG. 8 aids the operator in deciding whether to choose Yes, No or Cancel via the Query number 55 in the first line of the display. Query numbers range from 0 to 7, with 0 representing a perfect match; that is, the lower the Query number, the closer the match. The operator would generally be more inclined to choose Yes if the Query number is low and to choose No if the Query number is high. The operator should choose Cancel only if he is reviewing data from a client office that has already been assigned a format.

If no match is found, then the system displays a message to that effect, and the Format ID is set to the default format.

4. Align Claim Data

The Align Claim Data function is used to modify the alignment of the closest matching format found in Find Closest Match. The result of this function is a record format tailored to the specific client office whose data records are being examined.

Figure 9:
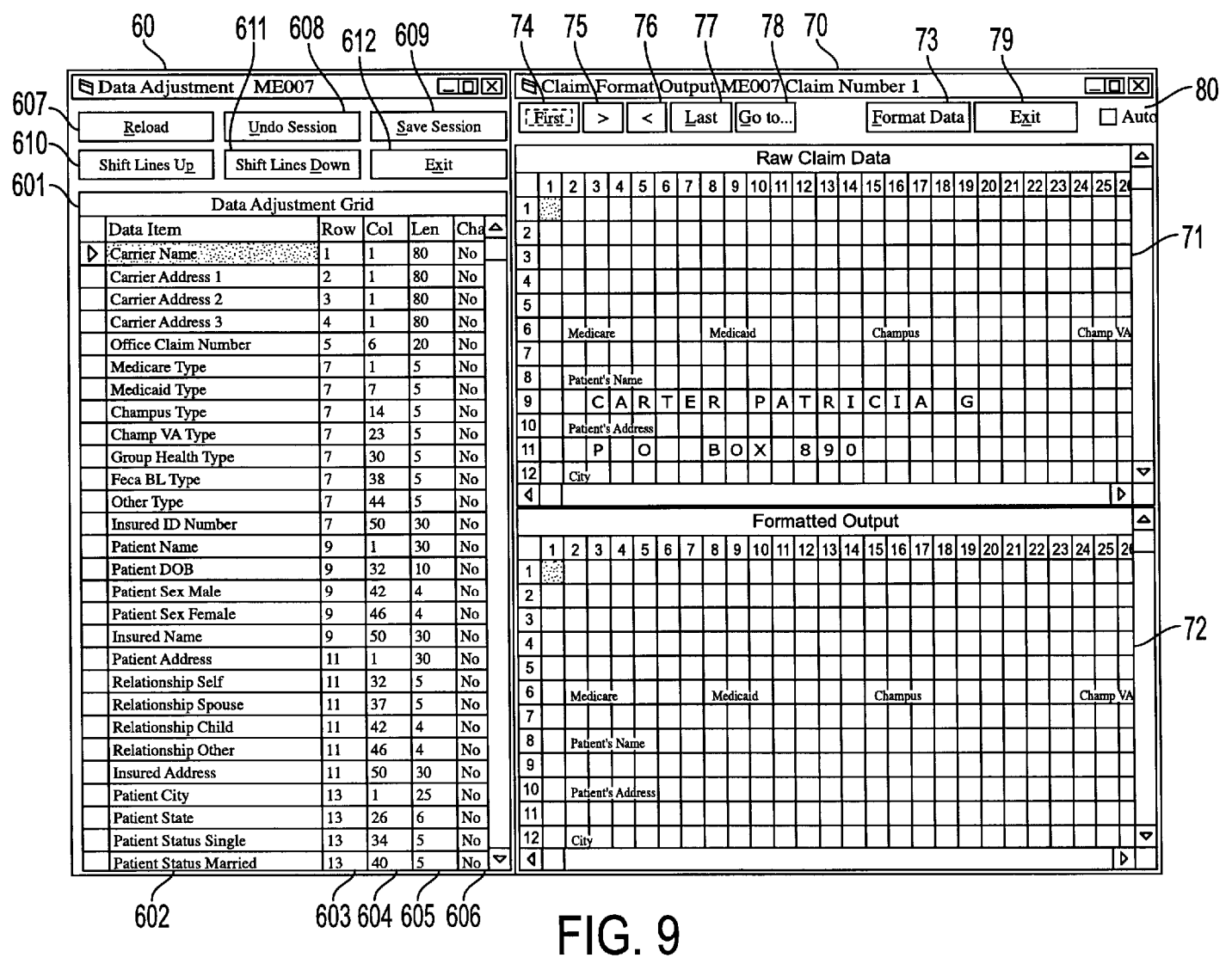

Specifically, using the Align Claim Data function, the operator aligns the data in a record of the input data file with that of an ideal format, for example, a perfect HCFA-1500 form. This is done using a "data alignment grid." The screen shown when Align Claim Data is invoked is depicted in FIG. 9 for an embodiment of the invention useful for processing medical insurance claim data using variations of the HCFA-1500 format.

The left side of the screen (Data Adjustment Screen 60) defines where the system is expecting to find claim data. This information is specified in Data Adjustment Grid 601 by Data Item 602, or field name of the HCFA form, Row 603, Column 604, Length 605 and Changed 606, which reflects the status of the data item's location (i.e., whether the operator has changed it from its standard location in HCFA-1500 format). The Row, Column and Length values can be changed to fit the actual location of the data as it is viewed on the right side Raw Claim Data screen 71. The Changed column is maintained by the system and displays "Yes" whenever the original row, column or length has been modified.

There are two screen views of data that can appear on the right side of the screen, Claim Format Output screen 70: The Raw Claim Data section 71 on top shows where data actually is; the Formatted Output section 72 on the bottom shows where the data has been positioned according to the Data Alignment Grid 601. The operator makes changes to Data Alignment Grid 601 so that the data is positioned within the correct box on the Formatted Output screen 72. To see the results of changes to Data Alignment Grid 601, the operator must select Format Data button 73 in Claim Format Output screen 70.

Format Data button 73 (or checking Auto Format 80, discussed below) activates a process called the Format Data.

The Format Data process accepts raw claim data and converts it to a standard format (in the present example, HCFA-1500); the result of this conversion appears in Formatted Output screen 72.

To align the claim data, the operator reviews the claim as it appears on the Raw Claim Data section 71 on the top of the right screen. The operator then makes changes to Data Alignment Grid 601 (on Data Adjustment screen 60) to correct the positioning of data. The operator then selects Format Data button 73 to check the results in the Formatted Output section 72 on the bottom of Claim Format Output screen 70. This could be repeated several times, reviewing the Formatted Output screen 72 for changes made, by selecting the Format Data button 73 to apply the most recent changes.

When the operator completes work on one claim, he selects Next Claim button 75 symbolized by ">" or Go to. button 78 to proceed to claims that were determined to contain unique or rarely used fields earlier when viewing the claim file. The new claim now seen in the Raw Claim Data screen 71 is not automatically formatted unless the Auto Format option 80 is checked (on). Otherwise the Format Data button 73 must be pressed to bring the two "views" into sync. Note that in this particular embodiment, the Formatted Output screen 72 will display only the first service line of an HCFA-1500 claim record. Therefore, the "Total Charge" field will appear incorrect on multiple service line claims.

To return to the first claim of the test file, the operator presses First button 74. If the Auto Format option 80 is checked, then the claim will be formatted in the Formatted Output section 72. Otherwise Format Data button 73 must be pressed to obtain a formatted claim.

After making any change to the Data Alignment Grid 601 (e.g., changing a row, column or length), the operator must make sure to move off the particular field that he changed in order to have the change be accepted into the FormatLayoutTemp table. This table will keep a temporary file of all the changes made since starting with the Format ID selected in Find Closest Match. Pressing Save Session 609 on the Data Adjustment screen 60 is not required.

It is expected that the operator may wish to interrupt the Align Claim Data process and resume it at a later time. Therefore, the operator is able to exit the UCF Application entirely such that when he re-enters the Align Claim Data, the new "session" will pick up where he left off. If after making changes the second time the operator wishes to go back to the last session in the FormatLayoutTemp table, he need only use the Undo Session button 608. If the operator would like to start over at the beginning, the point directly after selecting a starting Format ID through the match process, he may use the Reload button 607. A prompt appears, asking if the first Format ID selected is, in fact, where the operator would like to return.

The functions of buttons 607–612 and 73–80 are summarized as follows:
First/Last (74/77) Takes the screen from the current claim viewed to the first/last claim of the file.
>(Next claim 75) Displays the next claim in the file.
<(Previous claim 76) Displays the previous claim in the file.
Go to. 78 Prompts for entry of a claim number and then displays that claim of the file.
Format Data 73 Repositions the data elements of the raw claim data according to the row/column/length values contained in the Data Alignment Grid 60, displaying the formatted claim in the Formatted Output screen 72.
Auto Format 80 This check off box tells the system to format the raw claim presented in the Raw Claim Data screen 71 as the operator selects claims in the file. For example, if Last button 77 is clicked and Auto Format 80 is checked, the last claim in the file will automatically be displayed with formatting in Formatted Output screen 72.
Exit 612 Closes the Align Claim Data function and returns the operator to the Main menu. The content of the Data Alignment Grid 601 have already been saved in the temporary file upon making changes, so all data shifting will be saved.
Reload 607 Returns to the original format or starting point. All changes will be lost when this feature is invoked. This may be a useful option if many changes to the Alignment Grid 601 have been made and the user wants to start over.
Undo Session 608 Restores the contents of Data Alignment Grid 601 to the values that were present prior to re-entering the Align Claim Data.
Save Session 609 Saves the current contents of the Data Alignment Grid 601 in a temporary file created to hold the alignment format of this specific office during development of a customized format.
Shift Lines Up 610 This button may be clicked to perform a shift up by one row of all lines of data after a specified row. If, for example, the data on the Raw Claim Data screen 71 is on row 10 and needs to be on row 9, and all subsequent lines are one row below where they should be, this button would be used. A prompt appears asking for a starting row, and in this example, the operator would enter 10. All rows from 10 and below will then be changed to row number −1.
Shift Lines Down 611 This button is used to shift all of the lines of data of the claim after a certain row down one. If the data in the Raw Claim Data screen 71 is in row 8 and needs to be in row 9, and all subsequent lines are one row above where they should be, Shift Lines Down button 611 would be used. A prompt appears asking for a starting row, and in this case, the operator would enter 8. All rows from 8 and below will then be changed to row number +1.
Exit 612 Closes the Align Claim Data function and returns the operator to the main menu screen (FIG. 1). The contents of the Data Alignment Grid 601 have already been saved in the temporary file upon making changes, so all data shifting is saved.

Figure 10A:
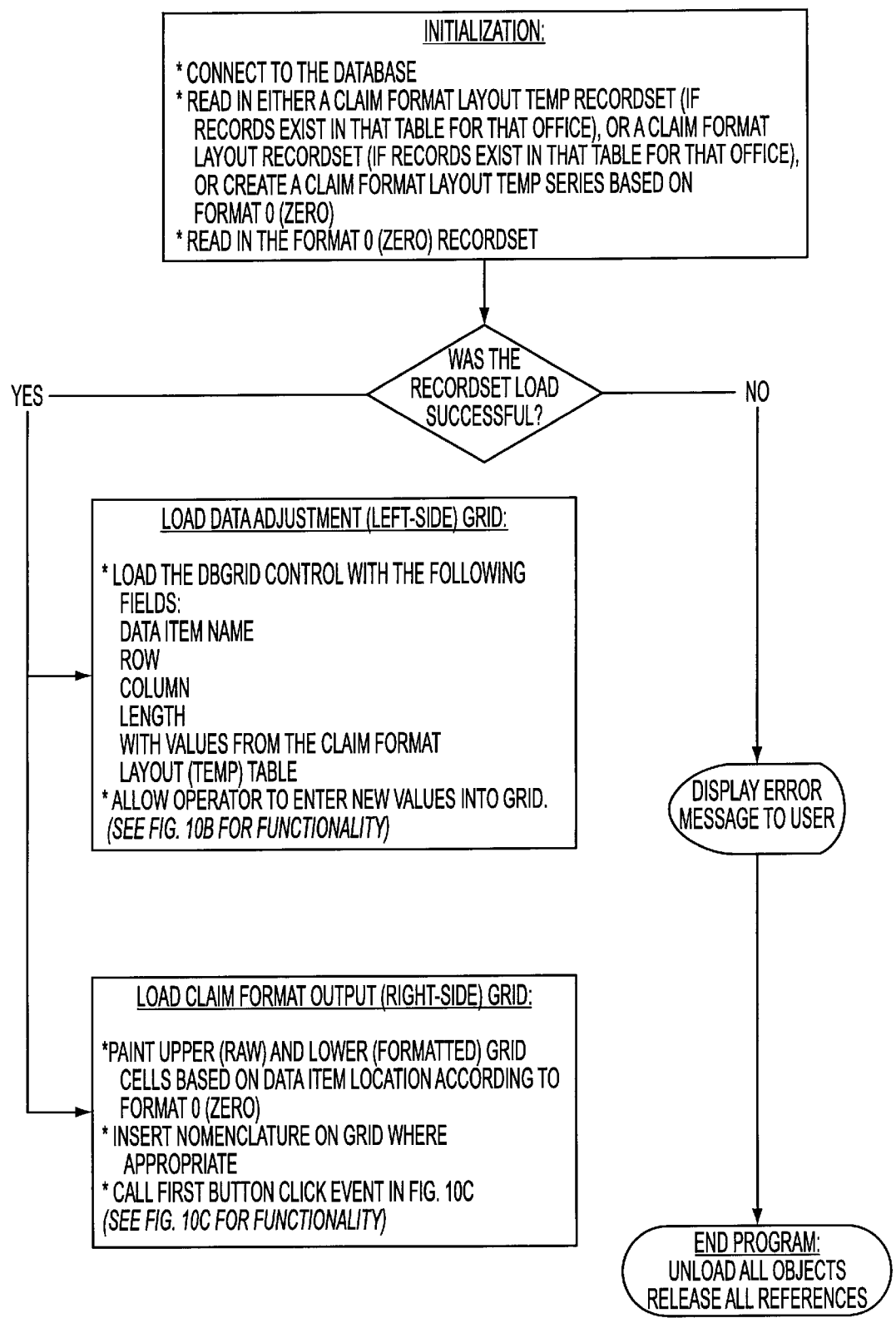
FIGS. 10A–10C are flowcharts showing the operation of a program module for implementing the Align Claim Data function, according to an embodiment of the invention.
Figure 10B:
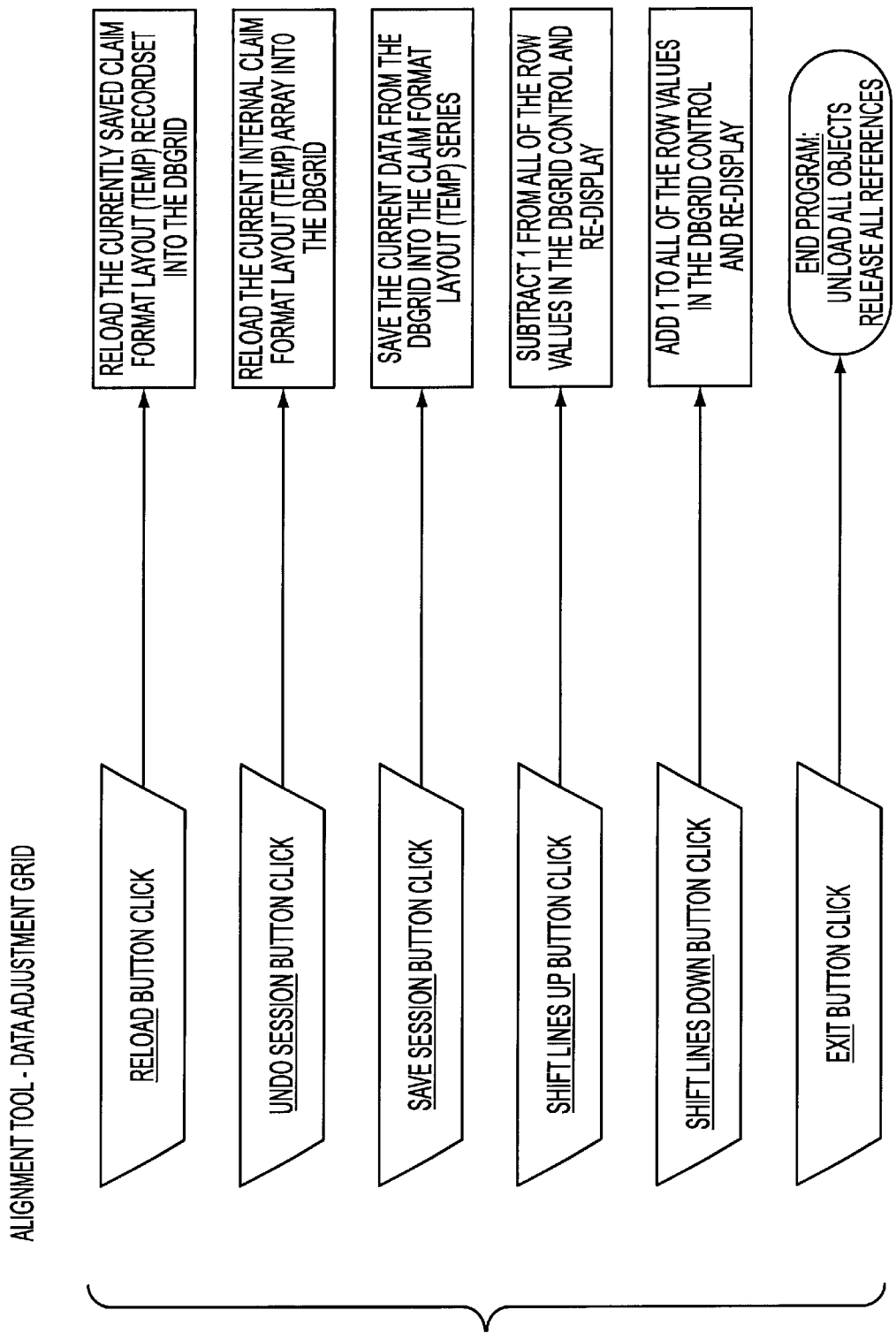
Figure 10C:
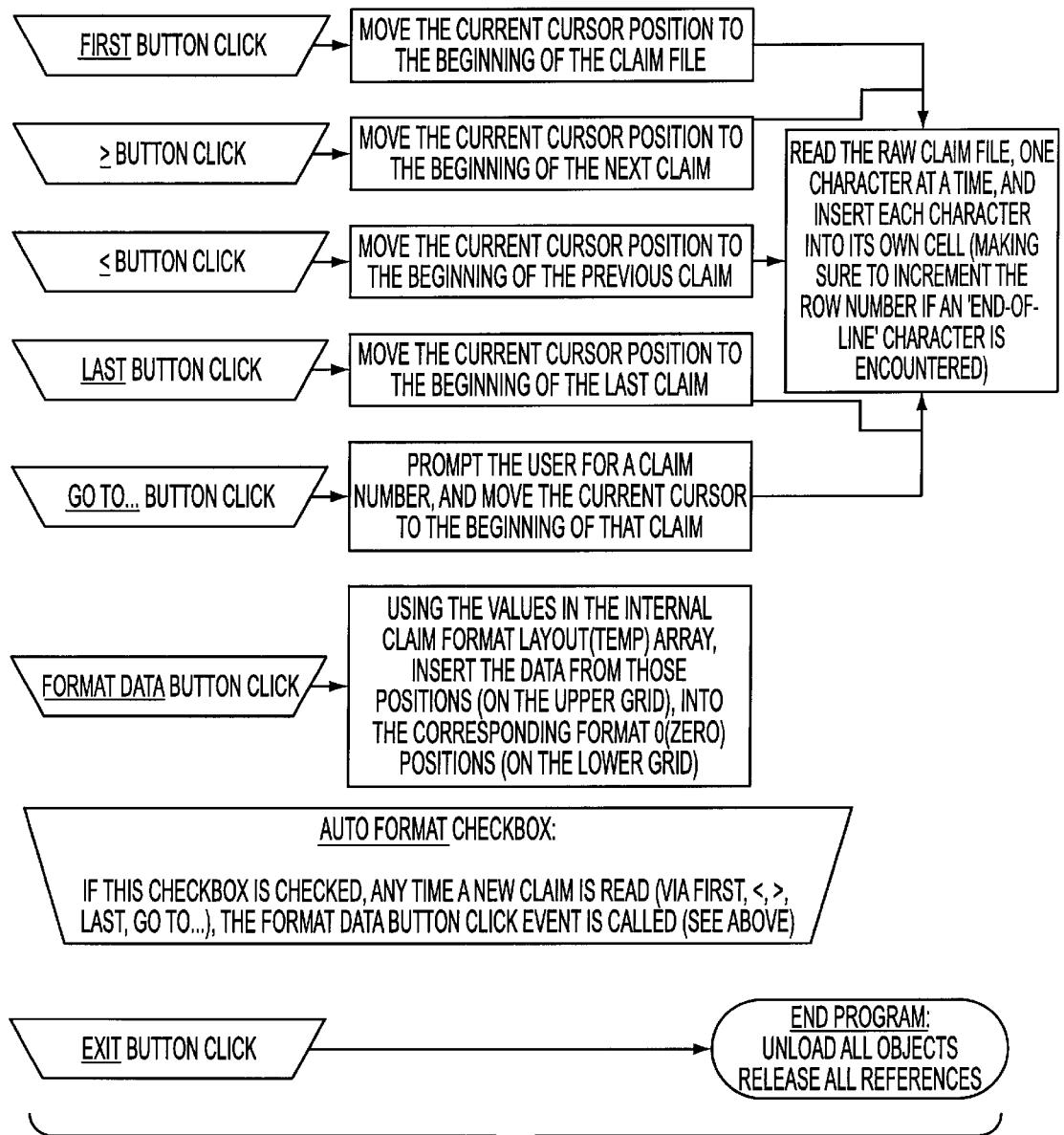

FIGS. 10A–10C show flowcharts depicting the structure of a program module implementing the processes described above.

5. Save Office Format

Figure 11:
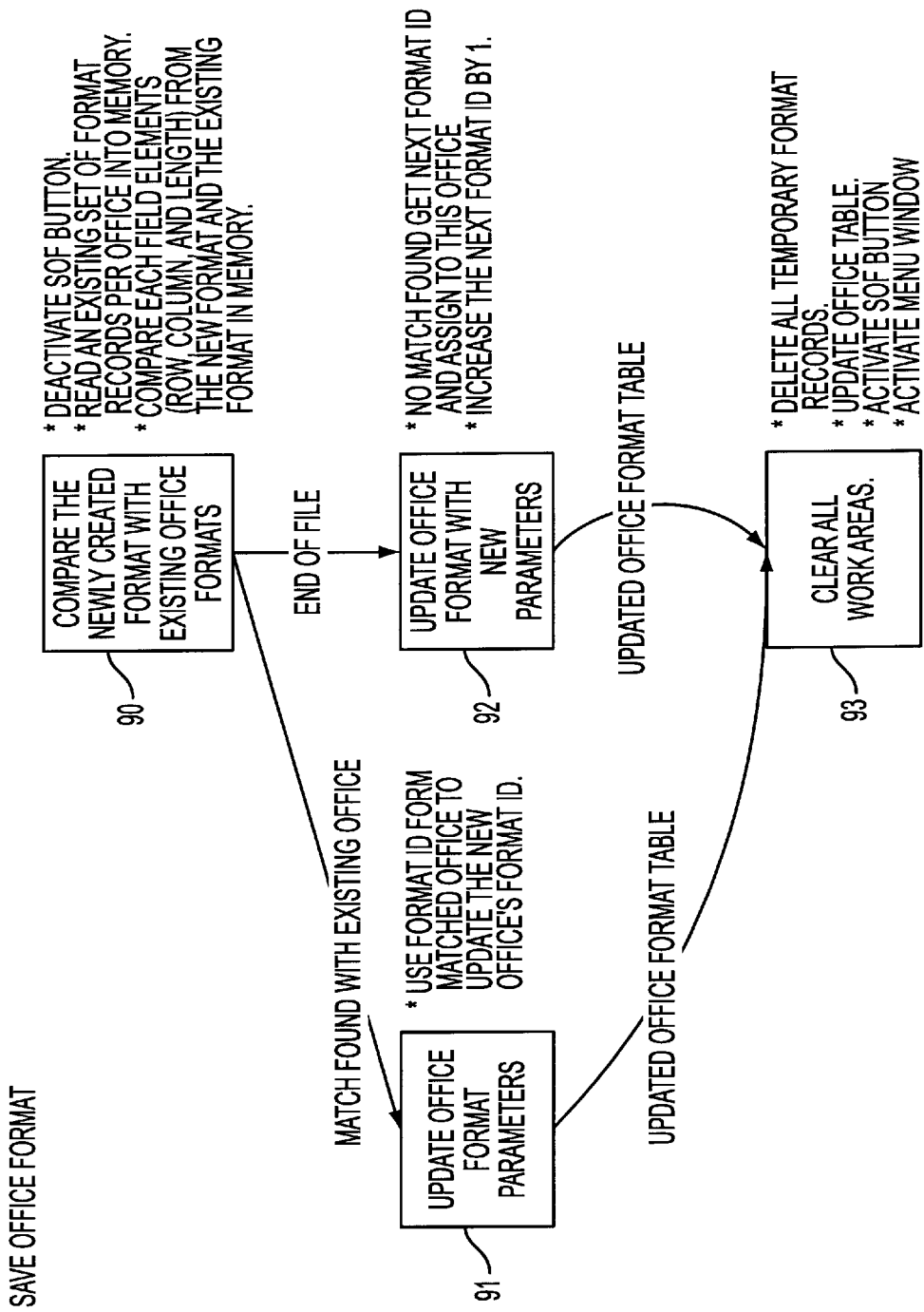
FIG. 11 is a flowchart describing the operation of a program module for implementing the Save Office Data function, according to an embodiment of the invention.

The Save Office Format function permits the operator to save the format that has been created through the previous functions. This function is depicted in the flowchart of FIG. 11. When the operator clicks the Save Office Format button in the main menu screen (FIG. 1), the program goes to Step 90 and compares the newly created format with existing stored formats. If a match is found, the program goes to Step 91, where the client office corresponding to the newly-created format is associated with the Format ID of the matching format. If no match is found, the program goes to Step 92, where the newly-created format is saved as a new format with a new Format ID that is then associated with the particular client office. Step 93, to which the program proceeds following either of Steps 91 and 92, terminates the Save Office Format function. In the process of going through these steps, the program may, optionally, display informational screens, informing the operator of what the program is doing.

The five functions described above form the core of the inventive method/computer program product. However, there is one additional function indicated in the main menu screen of FIG. 1 that is useful in the overall process, the Run Claim Edits function. Run Claim Edits invokes a batch processing routine to apply the newly-created format to the entire data file being examined, thus creating a file of records in a common format, used in further processing. A function called the Move Engine function, is invoked as part of this function to format each record in the file into the common format. The Move Engine function uses the newly-created format to batch-process the records. Run Claim Edits further creates informational reports on the processing and permits the operator to view the data records thus created in the common format. The informational reports may contain, for example, information on types of errors and numbers of each type of error. They may also contain information about the data itself (for example, in the case of medical insurance claims, they may contain information relating to number of claims received, number of claims processed, dollar amounts, etc.). By examining the informational reports and viewing the results of the processing, the operator may determine whether or not the format being used is correct. If it is not correct, the operator must return to Align Claim Data to adjust the format. Otherwise, the operator may invoke Save Office Format.

In addition to the above functionalities, the method/computer program product includes an independent step or program called a Move Engine. The Move Engine performs function similar to the Move Engine function invoked in the Run Claim Edits function. That is, the Move Engine performs batch processing of records in an input file to convert them to records in a common format. However, the Move Engine, as an independent entity, requires an Office ID and an indication of the file upon which Move Engine will operate. Move Engine then searches the aforementioned database of office information to find the format associated with the entered Office ID and uses that format to batch-process all of the records in the file, without further intervention by the operator. Move Engine thus makes it possible to process future input files from the client's office without repeating the steps of creating a new format each time the office submits data.

There is, additionally, the possibility that the above steps may not result in a correct format. In such cases, a programmer must create a separate "scrubber" program to process the particular client office data records into the desired common format. This is, however, expected to be a relatively rare occurrence.

Although some of the above discussion focuses on the specific case of medical insurance claim records, the inventive method and system may be used for other types of data. For example, the same concepts may be useful with other types of insurance records or with non-insurance records. Thus, the present invention has applications beyond the medical insurance claims field.

The invention has been described in detail with particular reference to preferred embodiments thereof, but it will be understood that variations and modifications can be effected within the spirit and scope of the invention.

We claim:

1. A method of formatting input files having multiple records into a common file format, said method comprising the steps of:

viewing information about a source submitting an input file containing data records in a format used by the source;

examining the submitted input file and determining parameters of the format of the data records of the submitted input file, further comprising the sub-step of:

choosing whether or not to perform a garbage collection function in which control characters are removed, added, or modified;

finding a known data format, stored in a format database, that most closely matches the format used by the source;

aligning the data contained in a given record of the input file with a standard format, thus creating a format corresponding to that used by the source; and if the resulting format is different from all other formats stored in the format database, permitting the saving of the resulting format in the format database as a new format.

2. The method as set forth in claim 1, further comprising the step of:

associating the source with a particular format and saving this information in a source database.

3. The method as set forth in claim 2, further comprising the steps of:

receiving a subsequent input file from a source with which a format has already been associated;

receiving information identifying the source;

using the received information to search a database of sources to determine the format associated with the source;

retrieving the format associated with the source from the format database; and batch-processing the input file to convert records in the input file to the common format, using the retrieved format.

4. The method as set forth in claim 1, further comprising, prior to the step of viewing information, the step of:

searching a source database to determine if information exists about the source submitting the input file.

5. The method as set forth in claim 1, further comprising the steps of:

batch processing the input file using the resulting format, thus converting the data records in the file to a common format; and viewing the results of the batch processing to determine whether or not the resulting format gives acceptable results.

6. The method as set forth in claim 5, wherein the step of batch processing further comprises the step of:

producing at least one file of statistical and aggregate information about the batch processing and about the data.

7. The method as set forth in claim 6, wherein the step of viewing the results further comprises the steps of:

viewing the at least one file of statistical and aggregate information; and viewing at least one data record formatted into the common format.

8. The method as set forth in claim 1, wherein the step of finding a known data format further comprises the step of:

providing an option of using either the data format found or a default data format.

9. The method as set forth in claim 8, wherein the step of aligning further comprises the steps of:

applying the data format chosen in the step of providing an option to at least partially align a data record of the input file; and manually performing further alignment.

10. The method as set forth in claim 1, further comprising the step of:

if the steps of viewing, examining, finding and aligning fail to provide an acceptable data format, writing a separate "scrubber" program to perform conversion of files from the particular source to the common file format.

11. The method as set forth in claim 1, wherein each record comprises an insurance claim.

12. The method as set forth in claim 11, wherein each insurance claim is a health insurance claim.

13. A computer system implementing the method of claim 1.

14. A computer-readable medium comprising program modules that implement the method of claim 1.

15. A computer system that converts input file formats into a single common file format, said input file containing at least one data record in an input file format, said computer system comprising:

a computer; and a computer-readable medium, the computer-readable medium having software embodied thereon comprising:

a View Office Information module, providing a system operator with the ability to view information about a source submitting an input file;

an Examine Test Claim File module, allowing the system operator to view data from the input file, the Examine Test Claim File module further comprising:

a Garbage Collection module, providing for the removal, addition and modification of control characters in a data record;

a Find Closest Match module, automatically searching a known format database for a format that most closely matches the format of the data records of the input file;

an Align Claim Data module, providing the system operator with the capability of modifying the format found by the Find Closest Match module to create a newly-created format tailored to the source's input file format; and a Save Office Format module, allowing the system operator to save the newly-created format in the known format database.

16. The computer system as set forth in claim 15, wherein the Save Office Format module comprises:

an Associate Format sub-module that associates the source with a particular format and saves this information in a source database.

17. The computer system as set forth in claim 16, wherein the software further comprises:

a Move Engine, said Move Engine including modules to receive a subsequent input file from a source with which a format has already been associated; to receive information identifying the source; to use the received information to search the source database to determine the format associated with the source; to retrieve the format associated with the source from the known format database; and to batch-process the input file to convert records in the input file to the common format, using the retrieved format.

18. The computer system as set forth in claim 15, wherein software further comprises:

a Search Source Database module that determines if information about the source of the input file already exists in a source database.

19. The computer system as set forth in claim 15, wherein the software further comprises:

a Run Claim Edits module that performs batch processing of the input file using the newly-created format to convert the data records in the input file to the common format and that allows the system operator to view results of the batch processing to determine whether or not the newly-created format gives acceptable results.

20. The computer system of claim 19, wherein results of the batch processing include at least one file of statistical and aggregate information about the batch processing and about the data.

21. The computer system of claim 20, wherein the results viewed by the system operator include at least one file of statistical and aggregate information and at least one data record formatted into the common format.

22. The computer system of claim 15, wherein the Find Closest Match module provides the system operator with an option of using either the data format found thereby or a default data format.

23. The computer system of claim 22, wherein the Align Claim Data module comprises:

a sub-module that applies the data format chosen in the Find Closest Match module to at least partially align a data record of the input file; and a sub-module that permits the system operator to manually perform further alignment.

24. The computer system of claim 15, wherein each record represents an insurance claim.

25. The computer system of claim 24, wherein each insurance claim is a health insurance claim.

26. The computer system as set forth in claim 15, the software further comprising:

a Format Data module, invoked by the Align Claim Data module, which formats a data record from the input file according to the newly-created format to create a display in a standard format.

27. The computer system as set forth in claim 26, wherein the software further comprises:

a Run Claim Edits module that performs batch processing of the input file using the newly-created format to convert the data records in the input file to the common format, said batch processing invoking a Move Engine sub-module that performs the conversion.

* * * * *